United States Patent [19]

Templeton

[11] 4,219,875
[45] Aug. 26, 1980

[54] DIGITAL EVENT INPUT CIRCUIT FOR A COMPUTER BASED PROCESS CONTROL SYSTEM

[75] Inventor: Steven R. Templeton, Phoenix, Ariz.
[73] Assignee: Honeywell Inc., Minneapolis, Minn.
[21] Appl. No.: 903,103
[22] Filed: May 5, 1978
[51] Int. Cl.² .............. G06F 11/06; G06F 15/46
[52] U.S. Cl. .................... 364/200; 364/554
[58] Field of Search ... 364/200 MS File, 900 MS File, 364/552, 554; 235/92 CA, 92 ST; 340/183

[56] References Cited
U.S. PATENT DOCUMENTS

| | | | |
|---|---|---|---|
| 2,922,990 | 1/1960 | Anderson | 340/174 |
| 3,147,370 | 9/1964 | Lowuran | 364/552 |
| 3,602,700 | 8/1971 | Jerva et al. | 235/92 CA |
| 3,609,308 | 9/1971 | Lemon et al. | 235/92 CA |
| 3,683,345 | 8/1972 | Faulkes et al. | 235/92 CA |
| 3,704,362 | 11/1972 | Kolby et al. | 364/552 |
| 3,931,610 | 1/1976 | Marin et al. | 235/92 CA |
| 4,001,785 | 1/1977 | Miyazaki et al. | 364/554 |
| 4,056,778 | 1/1977 | Randazzo | 235/92 CA |
| 4,057,847 | 11/1977 | Lowell et al. | 364/200 |

Primary Examiner—Gareth D. Shaw
Assistant Examiner—E. Chan
Attorney, Agent, or Firm—L. J. Marhoefer; L. D. Burton

[57] ABSTRACT

A computer based process control system includes a digital event counter input circuit wherein a number of data sources are scanned. A sensed status of the individual input point is compared with the previous status of that point to determine if a change of status has occurred, indicative of an event to be counted. The previous status is stored in a dedicated register. If the comparison indicates that a countable event has occurred, a counter is incremented; also the dedicated register is updated to indicate the present status of the scanned point. The counter status is stored in an accompanying memory which may then be read out by an external device such as a processor.

7 Claims, 7 Drawing Figures

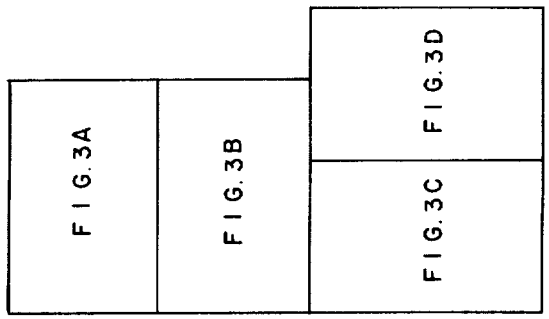
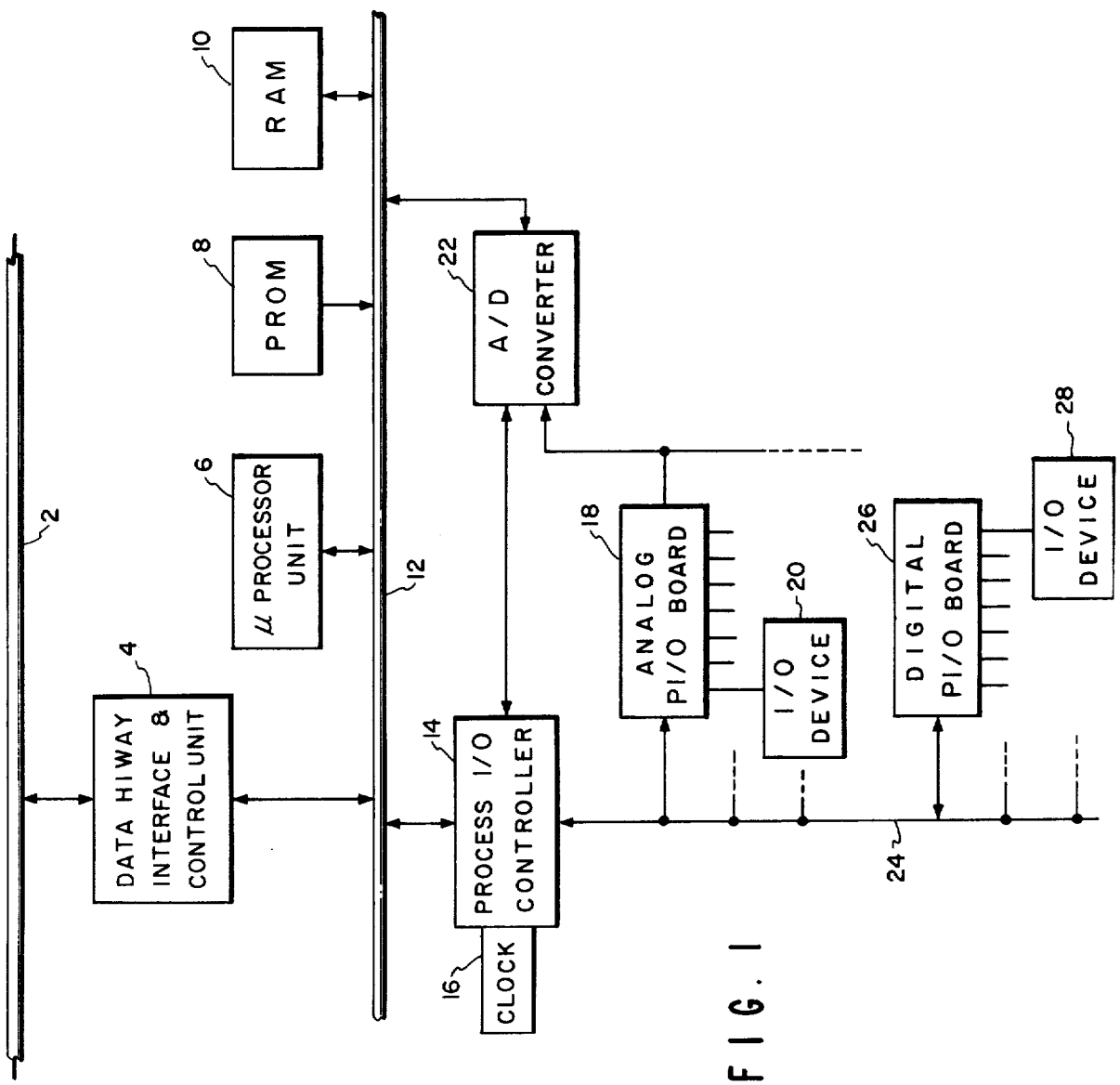

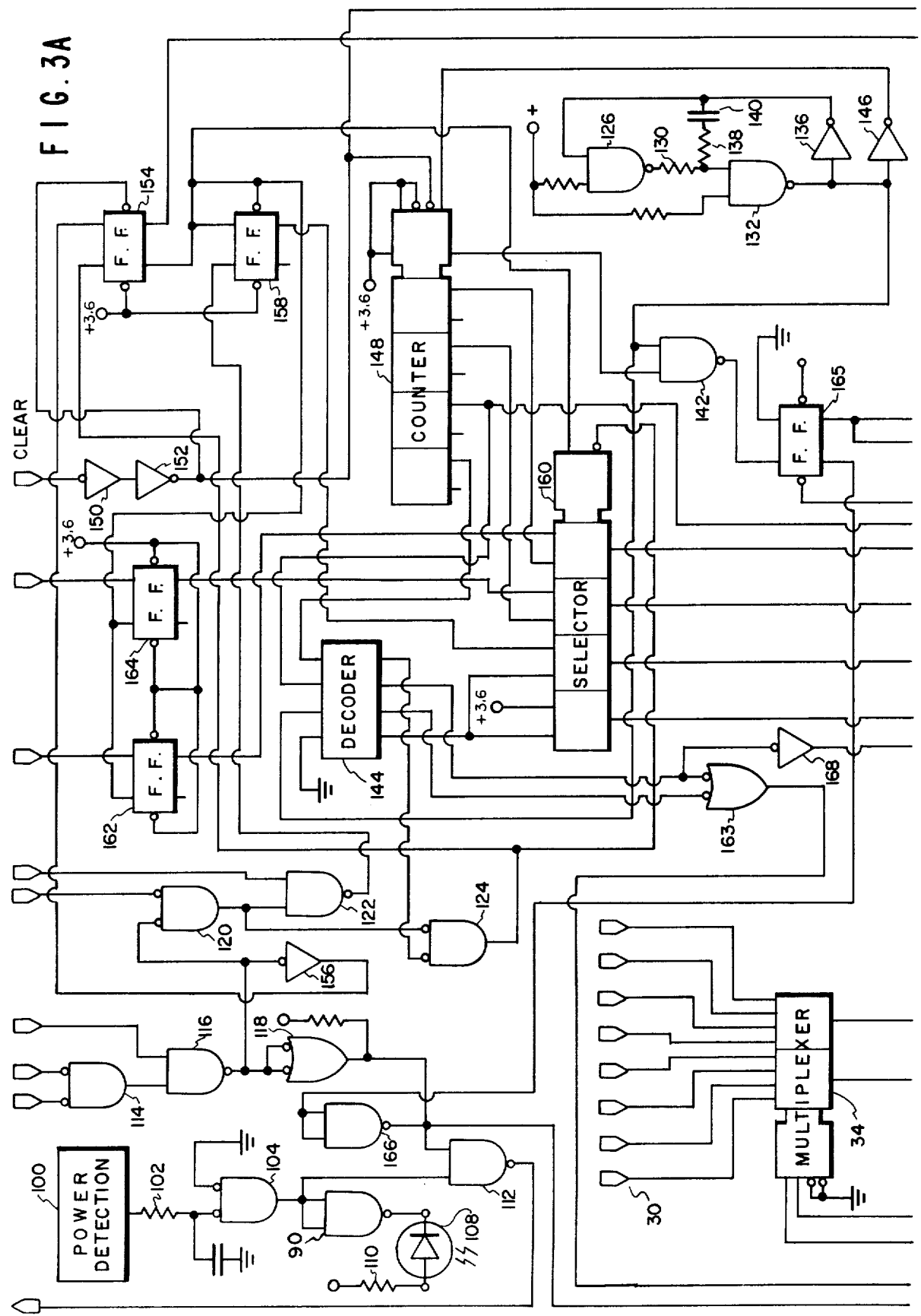

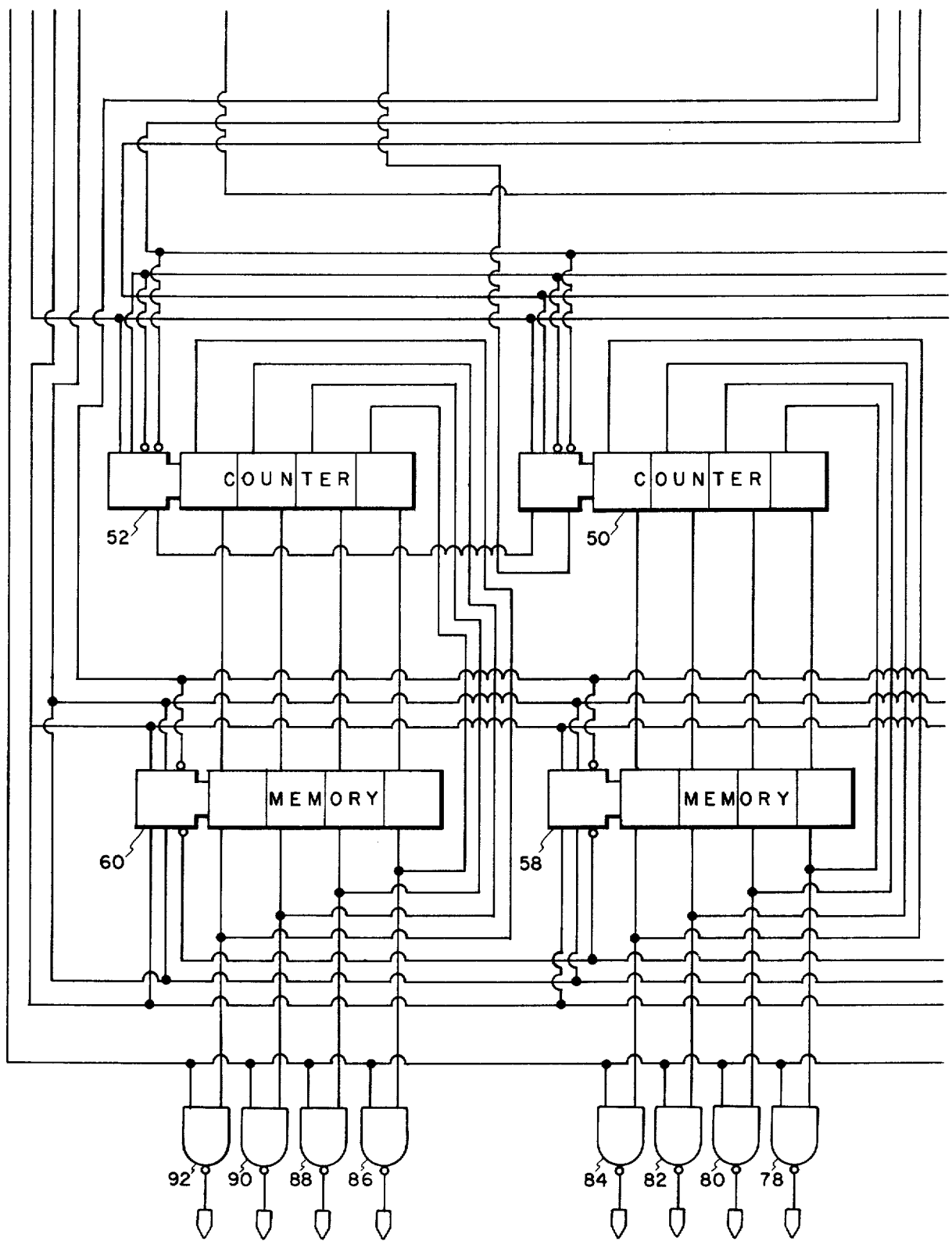
F I G. 3C

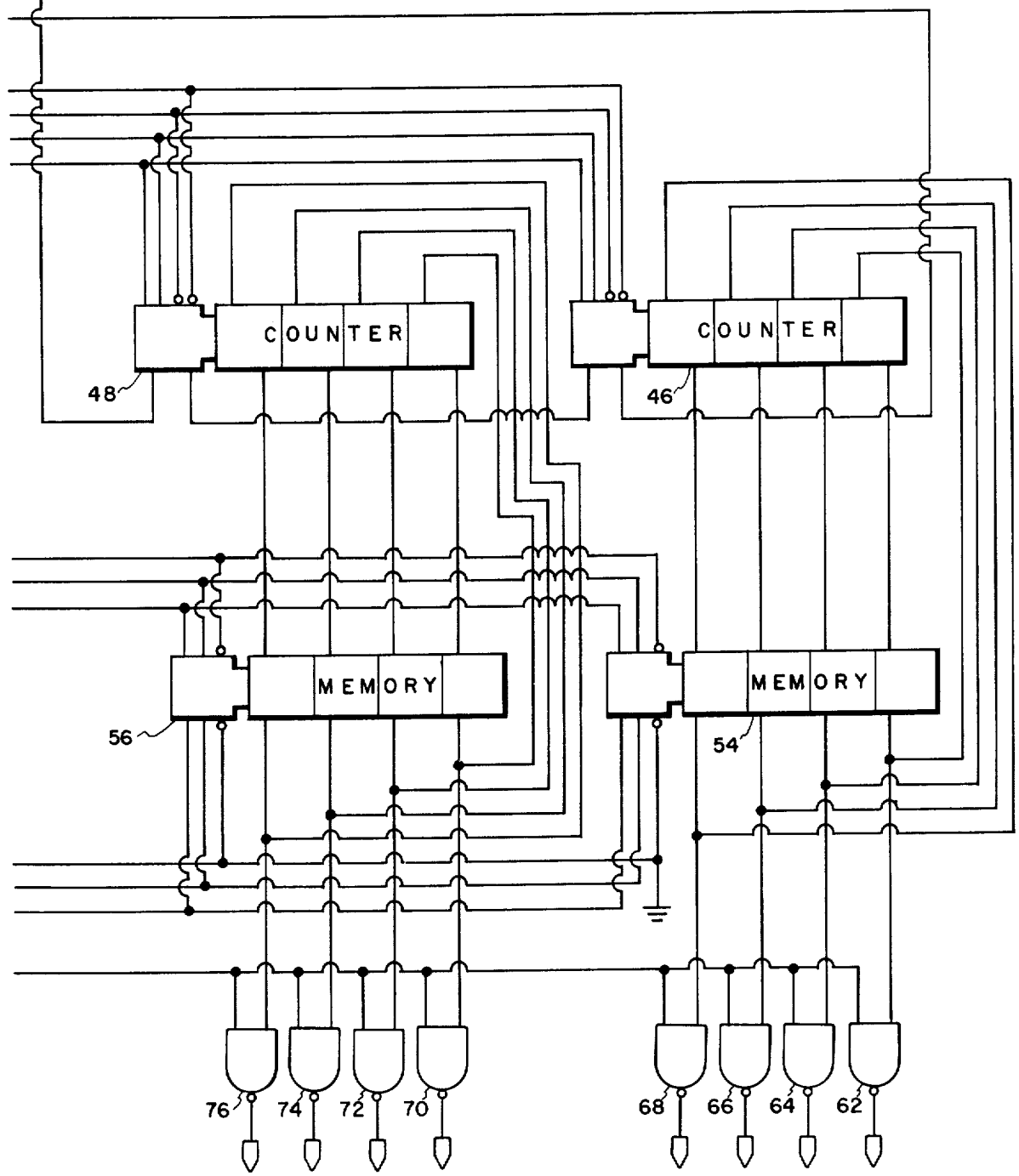

DIGITAL EVENT INPUT CIRCUIT FOR A COMPUTER BASED PROCESS CONTROL SYSTEM

CROSS REFERENCES

Cross reference is made to the following copending applications:

Woods et al, Ser. No. 773,913, filed Mar. 3, 1977
Wilske, Ser. No. 866,000, filed Dec. 30, 1977.

BACKGROUND OF THE INVENTION

The present invention relates to process control apparatus. More particularly, it relates to improved digital input circuitry for use with a computer based process control system in which the input is representative of a count of process related events.

In the art of industrial process control, there have been provided systems wherein various parameters of the process are measured, compared with the desired value, and a difference used to derive a control or input signal. In a number of cases, both the input, or measured variable signals and the output signal are in the form of analog signals. In some cases, however, the primary sensing elements produces signals representative of measured variables in the form of digital signals. In such systems, a great number of input circuits share a single process control computer. Again, in certain situations, the digital signals represent a count of recurrent events in the course of the controlled process. The parametric signals may be in the nature of a form A switch closure or a form C switch closure and may represent such parameters as the movement of a conveyor belt or object thereon, a turbine speed, a fluid flow or the like. To be meaningful to the computer, the events must be counted and the results presented in digital form.

SUMMARY OF THE INVENTION

It is, accordingly, an object of the present invention to provide an improved digital input circuit for computer based process control systems.

It is another object of the present invention to provide an improved digital input circuit as set forth wherein the input signals are representative of a count of process related events.

In accomplishing these and other objects, there has been provided, in accordance with the present invention, a digital input circuit wherein the data sources are scanned. A sensed status of the individual input point is compared with the previous status of that point to determine if a change of status has occurred, indicative of an event to be counted. The previous status is stored in a dedicated register. If the comparison indicates that a countable event has occurred, a counter is incremented; also the dedicated register is updated to indicate the present status of the scanned point. The counter status is stored in accompanying memory means which may then be read by an external device such as a processor or C.P.U. Optionally, under control of the C.P.U. or other control center, the counters may be reset to 0 after each reading or, alternatively to be allowed to accumulate count.

BRIEF DESCRIPTION OF THE DRAWINGS

A better understanding of the present invention may be had from the following detailed description when read in the light of the accompanying drawing, in which:

FIG. 1 is a schematic block diagram of a system embodying the present invention.

DETAILED DESCRIPTION

Figure 2:
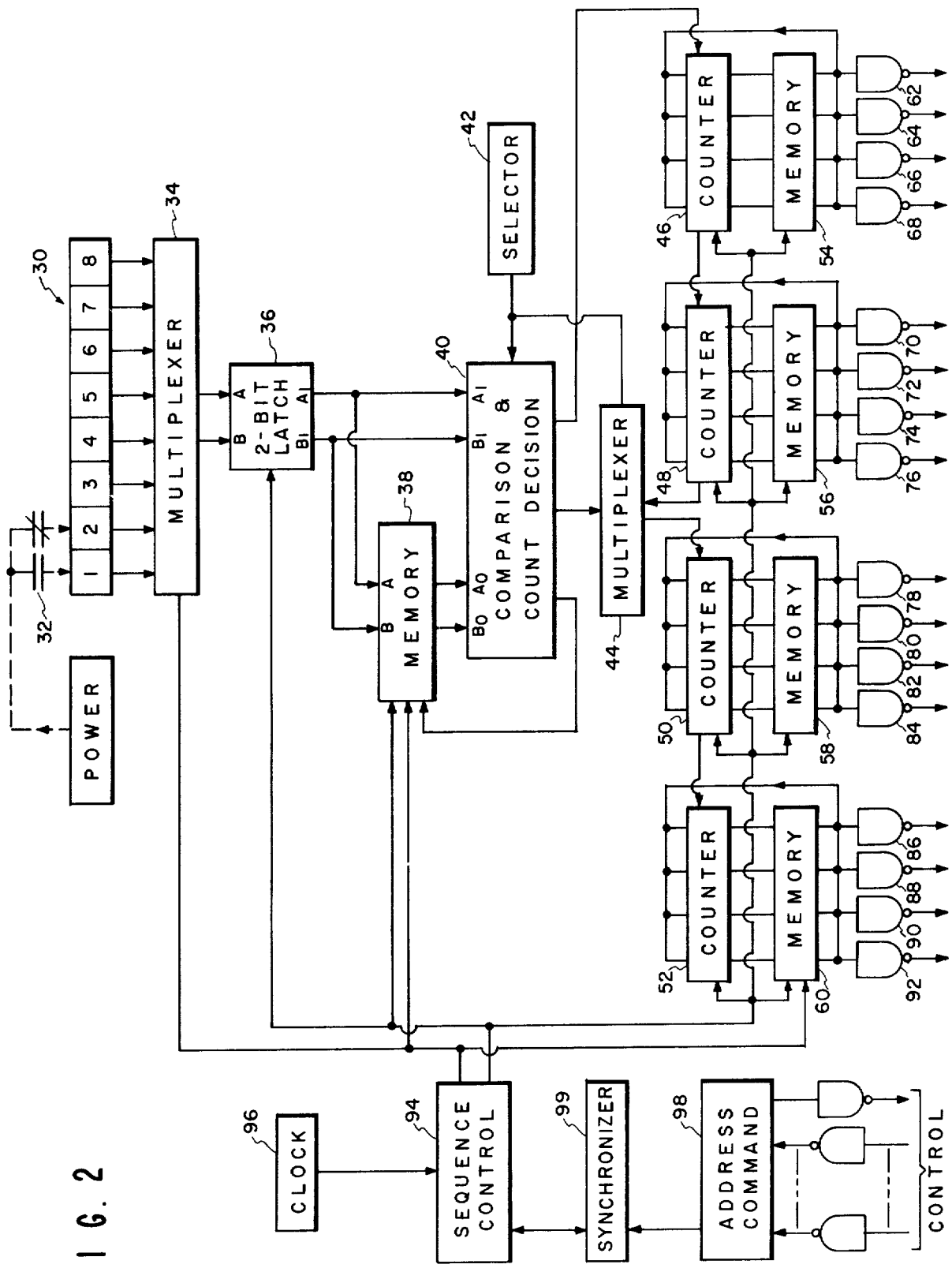
FIG. 2 is a schematic block diagram of an input circuit embodying the present invention.

Referring now to the drawing in more detail, there is shown in FIG. 1, in block diagram form, a computer based control system such as is shown in the copending application of Woods et al, Ser. No. 773,913, filed Mar. 3, 1977. In FIG. 1, there is shown a data highway 2, or communication bus, for communication with a host computer (not shown). The data interface and control unit 4 interfaces that communication bus with a subordinate control system. The subordinate control system includes a microprocessor unit 6, a PROM 8, in which is stored, among other things, the optional program for the microprocessor unit 6. There is also provided a RAM 10 in which is stored, among other things, data base tables for each of the data points involved in the control system, as well as a working local memory. These are all interconnected with each other and with the data highway interface control 4 by a microprocessor bus 12. Operatively connected to the bus 12 for responsive communication with the microprocessor unit 6 is a process Input/Output controller 14. The process Input/Output controller 14 includes a clock 16 which generates a series of clock pulses for the coordinate operation of the apparatus connected to be responsive to the process Input/Output controller 14. Included in the apparatus connected to the process Input/Output controller 14 is one or more analog process Input/Output boards 18 each having up to 8 analog input or output devices 20. An analog to digital converter 22 is connected to the analog process I/O boards 18 to convert the analog signals into digital signals for use by the microprocessor unit 6. Further, they are connected to the process I/O controller 14, through the process I/O bus 24, to one or more digital process I/O boards 26 to which are connected a plurality of digital input or output devices 28.

Under the control of a microprocessor unit 6, process data is gathered from the analog or digital input devices and is applied through the process I/O controller 14 to the microprocessor unit 6 for manipulation in accordance with the control algorithm for the particular data point. Also under the control of the microprocessor unit 6, output control signals are applied through the process I/O controller 14 to the analog and/or digital output boards 18 and 26 to their respective control devices or output devices 20 and 28. In the present case, it is one form of the digital input board 26 which is of particular interest.

To this end, there is shown in FIG. 2 a schematic block diagram of a digital input circuit wherein the output signals therefrom are representative of a count of process related events. Specifically, a plurality of input signal conditioning modules 30 (eight being shown) are connected to receive signals representative of the occurrence of events. The input signals are represented as being derived from the switch closure type of operation with the switches being triggered by the event detecting apparatus which is not a part of the present invention. It will be appreciated, that the switch closure input signals may be representative of either a form A type transfer or a form C type transfer. In the form A transfer, the event is indicated by a change in condition of a single switch from an opened condition to a closed condition. In the form C type of transfer, a pair of input lines are considered together with the switch elements in the two lines representing a complementary pair and the comparable event being represented by a transfer from one complementary state to the other complementary state.

In FIG. 2, the input signals are represented by the switches 32. It will, of course, be appreciated that the switches 32 may be solid state switching devices. The output of the signal conditioning modules 30 are applied to the corresponding number of input terminals on an input multiplexer 34. The output of the multiplexer is applied on two output lines to the input of a two bit latch 36. The output of the latch 36 is applied to a dedicated slot in a memory unit 38 and to an input of a comparator 40. The output of the memory unit 38 is also applied to other input means of a comparator 40. The comparator 40 effectively compares the present state of the input signal with the prior state of the input signal to determine if there has been a change in status indicative of a countable event. As will be seen hereinafter, the digital output of the circuit shown in FIG. 2 may selectively be in the form of two 8-bit data words or one 16-bit data word. A selection unit 42 for that purpose is connected to control the output of the comparator 40 to provide an output on either one or two output lines. The selection unit 42 also controls the operation of a 2 to 1 multiplexer 44. An output signal from the comparator 44 is also applied to a control input of the memory unit 38 to update the individually dedicated slots in the memory unit 38 if the comparator 40 has indicated that a countable event has occurred. The first output line from the comparator is applied as an input signal to a counter module 46 which is, in turn, cascaded to a second counter module 48. The carry output of the counter module 48 is applied to one input terminal of the multiplexer 44 while the second output line from the comparator 40 is applied to the other input terminal of the multiplexer 44. If the selection unit 42 is set to effect a single 16-bit word output, the multiplexer 44 is set to connect the carry output from the counter 48 to the input terminal of a third counter module 50 which is, in turn, cascaded to the input of a fourth counter module 52.

If a selection unit 42 is set to produce an output having two eight bit data words, the multiplexer 44 is set to connect the second output terminal from the comparator 40 to the input of the third counter module 50 while the first output lead from the comparator 40 continues to be applied to the input of the counter module 46.

Each of the counter modules 46, 48, 50 and 52 are 4-bit counters. In an exemplary model constructed in accordance with the present invention, these counter modules were of a type identified as SN 74 LS 161 distributed by Texas Instruments, Inc., among others. Each of these counter modules has four output terminals. The output of the counter module 46 is connected to four input terminals of a 4×4 memory module 54. Similarly, the output terminals of the counter module 48 are connected to four corresponding input terminals of a second 4×4 memory module 56. The four output terminals of each of the counter 50 and 52 are connected, respectively to four corresponding input terminals of a memory module 58 and 60. Each of these memory modules in the aforementioned exemplary model were of a type identified as SN 74 LS 670 again distributed by Texas Instruments, Inc., among others. Each of the memory modules 54, 56, 58 and 60 include four ranks of four bit memory, each rank of which is separately addressable. The four ranks or slots in the memory modules comprise dedicated memory addresses for the individual data points applied to the input of the multiplexer 34. This feature will be discussed in greater detail hereinafter. Each memory module includes four output terminals. The four output terminals of the four memory modules 54, 56, 58 and 60 are connected, respectively, to the input terminal of a line driver; the output terminal of each of the memory modules is also connected to the data input terminals of the corresponding bit positions in the corresponding counters 46, 48, 50 and 52. With that connection, each of the counters is preset to the value in the dedicated slot in memory for the particular input being sent at that time. If, then, the comparator 40 indicates that a countable event has occurred, the appropriate counter will be incremented to reflect that occurrence. The incremented count is then restored to the appropriate slot in the memory. The data in the memory is then available to be read out on the corresponding data lines.

The operation of the apparatus is under the control of a sequence and control circuit 94 which is, in turn, timed by an R.C. clock circuit 96. Thus, the input circuits are sequentially scanned through the operation of the input multiplexer 34 under the control of the addressing sequence from the control unit 94. Again, from the control unit 94, the timed operation of the 2-bit latch 36 is effected. Similarly, the prior state memory unit 38 is addressed and controlled by the sequence and control unit 94. The counters 46, 48, 50 and 52 as well as the memory module 54, 56, 58 and 60 are also controlled and sequenced by the control unit 94. Thus, the counter circuit may operate in a free-running sequence scanning the input data points and accumulating the count in the counters of the recurrent events. In the exemplary model hereinbefore referred to, the clock signal had a frequency of 10 MHz. As such, any input signal having a duration of at least 1.6 microseconds could be detected and counted.

When, on the other hand, it is desired by the control computer that the data be read out of the counter circuits, control signals are issued to the circuit from the computer by way of the communication busses referred to in the description of FIG. 1. After being duly processed by the intervening control circuitry including the microprocessor 6 and the process I/O controller 14, the unit is addressed with both address and command signals derived from the computer through an address and command logic circuit 28. The address and command logic unit 98 operates through an external synchronizaton circuit to override the sequence and control operation from the unit 94 and causes an addressed READ sequence to be effected from the selected outputs of the memory modules 54, 56, 58 and 60. When the READ sequence has been completed, the external sequencing control is removed and the circuit continues its internal cycling of scanning the input data signals and accumulating counts.

Figure 3B:
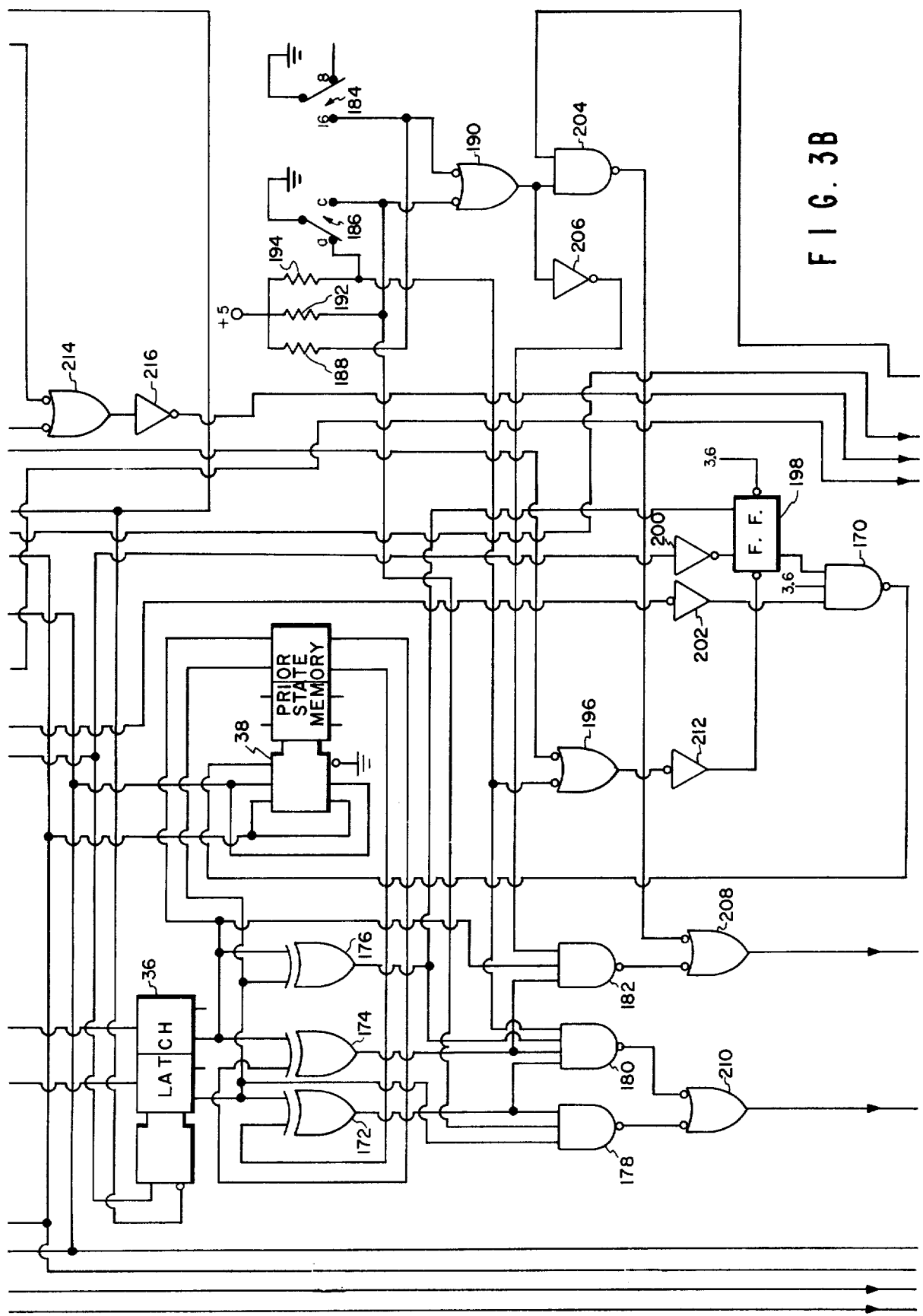
FIG. 3 is a block diagram illustrating the relationship between FIGS. 3A, 3B, 3C and 3D which, in turn, are logic diagrams of the structure shown in FIG. 2.

FIG. 3 is a block diagram showing the positional relationship of FIGS. 3A, 3B, 3C and 3D which together form a logic block diagram of the apparatus shown in FIG. 2. A power detection circuit 100 is substantially the same as a power detection circuit shown in FIG. 2B of a copending application, Ser. No. 866,000 of Lowell Wilske, filed Dec. 30, 1977. That circuit produces a signal when power has been applied to the circuit board. That signal is applied through a resistor 102 to one input terminal of a NAND gate 104, the other input terminal of which is grounded. The output terminal of the gate 104 is connected to both input terminals of a NAND gate 106, the output terminal of which is connected to a cathode of an LED 108, the anode of which is connected through a resistor 110 to a +5 volt power terminal. Thus, whenever the power detected circuit 100 has produced a signal indicating that operating power has been applied to the board, the LED glows to give a perceptible indication thereof.

The output of the NAND gate 104 is also connected to one input terminal of a NAND gate 112. In the exemplary embodiment of the present invention, the system includes a number of card file assemblies each of which includes a plurality of individual printed-wiring boards. Signals from the process control computer are transmitted over common bus lines. However, only the addressed printed-wiring board in the addressed card file assembly may respond to those signals. To this end, address signals are transmitted by the central processor which are decoded, for example, in the process I/O controller 14 (FIG. 1) to produce a card file assembly selection signal and a printed wiring board selection signal. These two signals are applied as input signals to a NAND gate 114. The output of the gate 114 is applied to one input terminal of a NAND gate 116. The second input terminal of the NAND gate 116 is connected to a bus terminal on which there is a signal indicative of the bus direction, that is, whether the apparatus is to be conditioned for reading or writing. When the signal is indicative of a READ condition, and the board has been addressed by way of the NAND gate 114, the NAND gate 116 is made. The output of the gate 116 is applied to both input terminals of a NOR gate 118, the output terminal of which is connected to the second input terminal of the NAND gate 112. Thus, when the board has been addressed in a READ mode and the power detect circuit has indicated that there is power applied to the board, the gate 112 is made, the output of which is connected to be returned to the process controller by way of the bus as an indication of acknowledgment that the board has been addressed and is under power. The output of the NAND gate 116 is also connected to one input terminal of a NAND gate 120. A second input terminal of the NAND gate 120 is connected to the communication bus to receive a READ STROBE signal. As will be seen, the READ STROBE signal controls the timing of the read sequence of the output of the present circuit. The output of the gate 120 is applied to one input terminal of a NAND gate 122 and simultaneously to one input terminal of a NAND gate 124. The second input terminal of the gate 122 is connected to a subroute signal derived from the process controller as will be discussed hereinafter.

An internal clock for establishing the basic internal timing of the entire circuit herein described comprises a first NAND gate 126 which has one input terminal connected through a resistor 128 to a +5 volt supply terminal. The output of the gate 126 is connected through a resistor 130 to a first input terminal of a second NAND gate 132. The second input terminal of the gate 132 is connected through a resistor 134 to the 5 volt supply terminal. The output of the NAND gate 132 is connected through an inverter 136 to the second input terminal of the NAND gate 126. A series connected resistor 138 and a capacitor 140 are connected between the first input terminal of the NAND gate 132 and the output of the inverter 136. The output of the gate 132 is also connected directly to one input terminal of a NAND gate 142 and to one input terminal of a decoder 144. In the exemplary embodiment of the invention, the decoder 144 was of the type identified as SN 74 LS 42 produced by, among others, Texas Instruments, Inc. Although that particular module has the capacity for a selection of one of ten output leads, only four of those output leads are used in the present instance. The output of the gate 132 is also applied through an inverter 146 to the toggle input of a counter 148, which may be of the type identified as SN 74 LS 161 supplied, by among others, Texas Instruments, Inc.

A master clear signal is applied to an input terminal from the computer controller has and applied to the input of a first inverter 150, the output of which is supplied to a second inverter 152, the cascaded inverters providing a measure of buffering for the input signal. The output of the inverter 152 is supplied to the CLEAR input terminal of the counter 148. The output of the inverter 152 is also applied to a CLEAR input terminal of a flip-flop 154. The output of the NAND gate 116 is connected through an inverter 156 to the DATA input of the flip-flop 154. The output of the NAND gate 124 is connected to the TOGGLE input of the flip-flop 154. The second input to the NAND gate 124 is connected to one of the output terminals of the decoder 144. The Q output terminal of the flip-flop 154 is connected to the DATA input terminal and the CLEAR input terminal of a flip-flop 158. The SET input terminals of the flip-flops 154 and 158 are both connected to a positive bias supply terminal. The TOGGLE input terminal of the flip-flop 158 is connected to the output of the NAND gate 122. The two flip-flops 154 and 158 correspond, substantially, to the external synch circuit 99 shown in FIG. 2. The Q output of the flip-flop 154 is also applied to the SELECT input terminal of a selector 160. The STROBE input of the selector 160 is connected to the output of the NAND gate 124. The selector in the exemplary embodiment was of the type identified as SN 74 LS 257 distributed by, among others, Texas Instruments, Inc. The selector 160 comprises, substantially, four stages of 2 to 1 selection or multiplexing under common input control.

The Q output of the flip-flop 154 is further connected to the TOGGLE input of each of two flip-flops 162 and 164. The DATA input terminal of the flip-flop 162 is connected to a first subaddress input terminal connected, in turn, to the process controller bus. Similarly, the DATA input terminal of the flip-flop 164 is connected to a second such subaddress terminal from the process controller bus. The $\bar{Q}$ output of the flip-flop 162 is connected to the A input terminal of the first selection segment of the selector 160. The $\bar{Q}$ output of the flip-flop 164 is similarly connected to the A input terminal of the second section of the selector 160. The B input terminal of the first section of the selector 160 is connected to the output terminal of the first section of the counter 148. Similarly, the B input terminal of the second section of the selector 160 is connected to the output terminal of the second section of the counter 148. The A input terminal of the third section of the selector 160 is connected to the Q output terminal of the flip-flop 158. The A input terminal of the fourth section of the selector 160 is connected to a positive biased supply terminal. The B terminal of both the third and fourth sections of the selector 160 are connected to one output terminal of the decoder 144. The second output terminal of the decoder 144 is connected to one input terminal of a NOR gate 163. The third output terminal of the decoder 144 is connected to the second input of the NOR gate 163. The fourth output terminal of the decoder 144 is connected to the second input terminal of the NAND gate 124. The output of the NAND gate 124 is further connected to the STROBE input of the selector 160.

One input of the decoder 144 is connected to the output of the fourth section of the counter 148. A second input of the decoder is connected to the third output of the counter 148. A second input of the decoder is connected to the third output of the counter 148. The clock output of the NAND gate 132 is connected to the third input of the decoder 134. The fourth input of the decoder 144 is connected to ground. The output of the NAND gate 142 is connected to the TOGGLE input of a flip-flop 165, the DATA input terminal of which is connected to ground. The CLEAR input terminal of the flip-flop 165 is connected to a positive bias supply. The SET input of the flip-flop 165 is connected to the output of the inverter 152. The Q output of the flip-flop 165 is connected to both input terminals of a NAND gate 166, the output of which is also connected to the second input terminal of the NAND gate 112. The output of the NAND gate 166, as well as the output of the NOR gate 118. is also applied to the enable input terminals of each of the line drivers 62 through 92.

A plurality of input terminals 30 (in the exemplary embodiment, there were eight such input terminals), are provided. These eight data input terminals are connected respectively to the eight input terminals of a multiplexer 34. The multiplexer in the illustrative embodiment was of the type identified as SN 74 LS 153 supplied by, among other. Texas Instruments, Inc. The multiplexer comprises essentially two 4 to 1 multiplexer sections with common operating controls. Thus constituted, the multiplexer provides an 8 to 2 multiplexed output. The STROBE terminals of the multiplexer are connected to ground. The A select input terminal of the multiplexer is connected to the output terminal of the second section of the selector 160 while the B select input terminal of the multiplexer is connected to the output of the first section of the selector 160. The operation of the multiplexer 172 is to select one of the input leads to the first section and connect that to a first output lead and simultaneously to select one lead from the second section and connect that to the second output lead. The two output leads from the multiplexer 172 are connected to the input terminals, respectively, of a latch 36. In the exemplary embodiment, a module of the type identified as SN 74 LS 175, distributed by Texas Instruments, Inc., was used for the latch 36. Although the module used was actually a four section latch, only two of the sections were utilized in the present embodiment. The elements 30, 34 and 36 shown in this figure bear the same reference numerals as the corresponding elements in the structure shown in FIG. 2. The CLEAR input terminal of the latch 36 is connected to the output of the inverter 152. The TOGGLE input of the latch 36 is connected to the output of an inverter 168, the input of which is connected to the second output of the decoder 144.

The output of the first section of the latch 36 is connected to a first data input terminal of a prior state memory 38. The output of the second section of the latch 36 is, similarly, connected to the second data input terminal of the prior state memory 38. Again, the memory unit 38 corresponds and bears the identical reference numeral to the prior state memory unit 38 illustrated in FIG. 2. In the illustrative embodiment, the prior state memory unit was a module of the type identified as SN 74 LS 670, again supplied by, among others, Texas Instruments, Inc. Here, too, the selected module is a 4 bit by 4 rank memory although only two bits of the memory in each of the four ranks is used. The memory unit 38 is provided with a plurality of input control terminals. One of the input control terminals is a READ ENABLE terminal which is connected to ground. The WRITE ENABLE terminal is connected to the output of a NAND gate 170. In order to address the several ranks individually, there are A and B READ and WRITE ADDRESS terminals. The READ and WRITE A terminal is connected to the output of the first section of the selector 160. The B READ and WRITE terminal is connected to the output of the second section of the selector 160.

The output of the first section of the latch 36 is also connected to one input terminal of an EXCLUSIVE OR gate 172 while the output of the second section of the latch 36 supplied to one input terminal of a second EXCLUSIVE OR gate 174. The output terminal of the first section of the prior stae memory 38 is applied to the second input terminal of the EXCLUSIVE OR gate 172. The output terminal of the second section of the prior state memory is connected to the second input terminal of the EXCLUSIVE OR gate 174. A third EXCLUSIVE OR gate 176 has its two terminals connected respectively to the two output terminals of the latch 36. The output of the EXCLUSIVE OR gate 172 is connected to one input terminal of a three input NAND gate 178. The output of the gate 172 is also applied to one input terminal of a four input terminal gate 180. A second input terminal of the gate 178 is connected to the output of the first section of the latch 36. The output of the second EXCLUSIVE OR gate 174 is connected to a second input terminal of the NAND gate 180 and to a first input terminal of a three input NAND gate 182. A second input terminal of the NAND gate 182 is connected to the output of the second section of the latch 36.

In FIG. 2, there was reference made to a selection unit 42 wherein a choice is made as to whether the output will be a single 16-bit word or two 8-bit words. The selection unit also includes means for configuring the circuit to accommodate a choice of either a form-A input signal or a form-C input signal. In FIG. 3, that selection means is represented by a first switch 184 and a second switch 186. While these switches are illustrated as being mechanical switches, it will be appreciated that the switches may also be solid state electronic switches or mere jumper connections on the terminal board. In both switches, the common terminal is connected to ground. In the switch 184, one contact is an open circuit contact while the other contact is connected through a resistor 188 to a positive bias supply terminal. That contact of the switch 184 is also connected to one input terminal of a NOR gate 190. With the switch 184 in the position illustrated, with the armature engaging the open contact, that switch is effective to select the two-word, 8-bit output. The switch 186 also has a first contact which is connected through a resistor 192 to the positive bias supply terminal. That same contact of the switch 96 is connected to a second input terminal of the NOR gate 190. That same contact is also connected to the third input terminal of the NAND gate 178. The second contact of the switch 186 is connected through a resistor 194 to the positive bias supply terminal. The second contact of the switch 186 is also connected to the fourth contact of the NAND gate 180 and to one input terminal of a NOR gate 196. The output of the EXCLUSIVE OR gate 176 is connected to the third input terminal of the NAND gate 180 and to the data input terminal of a flip-flop 198. With the switch 186 in a position shown, the apparatus is configured for a form-A input which is consistent with the two-word, 8-bit output signals. If either switch is moved to the opposite terminal from that shown, the system would be configured for a single 16-bit word output and the switch 186 would also configure the operation of the system for a form-C input. The output of the inverter 168 is applied through an inverter 200 to the toggle input of the flip-flop 198. The output of the fourth section of the selector 160 is connected through an inverter 202 to one input terminal of the NAND gate 170. The output of which is connected to the WRITE ENABLE input of the prior state memory 38. The output of the NOR gate 190 is connected to one input terminal of a NAND gate 204 and to the input of an inverter 206. The output of the inverter is connected to the third input terminal of the NAND gate 182. The output of the NAND gate 204 is connected to one input terminal of a NOR gate 208, the other input terminal of the NOR gate 208 being connected to the output of the NAND gate 182. The output of the NAND gate 178 is connected to one input terminal of a NOR gate 210, the other input terminal of which is connected to the output of the NAND gate 180. The output of the NOR gate 186 is connected through an inverter 212 to the preset input of the flip-flop 198. The $\overline{Q}$ output of the flip-flop 165 is connected to one input terminal of a NOR gate 214, the other input terminal of which is connected to the $\overline{Q}$ output of the flip-flop 154. The output of the NOR gate 214 is connected to the input of an inverter 216.

The output circuit of the system includes the counter modules 46, 48, 50 and 52 as well as the memory modules 54, 56, 58 and 60 as shown schematically in FIG. 2. A counter module, in the exemplary model, was of the type identified as SN 74 LS 161 (Texas Instruments, Inc.). Thus, each is a 4-bit binary counter with common controls. The output of the inverter 216 is connected to the CLEAR input terminal of all four counter modules. The output terminal of the third segment of the counter 148 is connected to the LOAD input terminal of all four of the counters as well as to the ENABLE-P input terminal of all four counter modules. The output terminal of the NOR gate 162 is connected to the CLOCK input terminals of all four of the counter modules. The output of the NOR gate 210 is connected to the ENABLE-T input terminal of the counter module 46. The CARRY output terminal of the counter module 46 is connected to the ENABLE-T input terminal of the counter module 48. The CARRY output terminal of the counter module 48 is connected to the second input terminal of the NAND gate 204. The output terminal of the NOR gate 208 is connected to the ENABLE-T input terminal of the counter module 50. The CARRY output terminal of the counter module 50 is connected to the ENABLE-T input terminal of the counter module 52.

The memory modules 54, 56, 58 and 60 are, like the memory unit 58, made up, in the exemplary model, of modules identified as SN 74 LS 670. Each of these modules is a 4 bit, 4 rank memory with common controls. Each of the four ranks are individually addressable both for writing and reading. The output terminals of the four sections of the counter module 46 are connected, respectively, to the four data input terminals of the memory module 54. The output terminals from each of the four sections of the counter are connected, respectively, through the four input terminals of the memory modules 58 and 60. The output terminals of the memory modules are connected, respectively, to one input terminal of each of the output line drivers represented by the NAND gates 62 through 92. In addition, the four output terminals from the memory module 54 are connected, respectively, to the input terminals of the four corresponding sections of the counter module 46. Similarly, the output terminals of the memory module 56 are connected, respectively, to the input terminals of the counter module 48. The output terminals of the memory module 58 are also connected, respectively, to the corresponding input terminals of the counter module 50 and the output terminals of the memory module 60 are connected, respectively, to the input terminals of the counter module 52. The output of the first and the second sections of the selector 160 are connected, respectively, to the address input terminals of the memory modules 54 through 60, both the read and the write address terminals. The output of the third section of the selector 160 is connected to the WRITE ENABLE or LOAD STROBE input terminal of the four memory modules. The READ ENABLE control terminal of each of the four memory modules 54, 56, 58 and 60 is connected to ground.

As in the discussion of the structure illustrated in FIG. 2, the clock 96, which corresponds to the clock circuit involving the NAND gates 126 and 132, generates a 10 MH$_z$ signal which establishes the basic timing for the internal structure of the digital counter input circuit. The sequence and control circuitry 94 illustrated in FIG. 2 is represented in FIG. 3A by the counter 148, the decoder 144, the selector 160, flip-flop 165 and the associated gates and inverters. In the absence of control signals from the process control computer, the output of the clock by way of the inverter 146 causes the counter 148 to cycle to provide internal signals for the selector 160 and the decoder 144. These, in turn, control the cycling of a multiplexer 34, the latch 36 and the prior state memory 38. Thus with the system configured in a form A relationship with two 8-bit output words, data input signals are applied to the input terminals 30 and considered two at a time by the multiplexer 34. The present state of the selected input signals are loaded into the latch 36. The output signals from the latch 36 are applied respectively to one input terminal of each of the EXCLUSIVE OR gates 172 and 174. The previous state of the same two signals will have been stored in the appropriate rank of the prior state memory 38, the address of that rank being derived from the selector 160. The output of the prior state memory 38 is applied to the other two input terminals of the two EXCLUSIVE OR gates 172 and 174 respectively. If there has been no change of state in the two input signals, the inputs to the EXCLUSIVE OR gates 172 and 174 will be identical with the result of a logical low level output. That low level output signal effectively disables the three NAND gates 178, 180 and 182, with the result that no new signal is clocked into the counter 46 or 50.

On the other hand, if there had been a change in either or both of the two input signals considered, there would have been an output signal from the corresponding ones of the two EXCLUSIVE OR gates 172 or 174 or both with the corresponding count being applied to the input of the counters 46 and 50. The arrangement of the counters with their associated memories is such that the counters are preset to the count from the addressed ranks in the associated memory. That count is then incremented or not incremented as indicated by the presence or absence of a change in the input signal and the resulting count in the counter is restored to that rank in the associated memory.

If the system had been configured either for a 16 bit word or a form C input signal, the output of necessity becomes a 16 bit word. In such an arrangement, the NAND gate 178 becomes DISABLED and the NAND gate 180 becomes ENABLED. In the form C configuration, the gate 182 becomes DISABLED, therefore no output from the input circuit can be applied directly to the input of the counter 50 through the gate 182. It will be remembered that a form C transfer requires a complementary pair of signals with the change occurring to both signals to produce the complementary opposite pair. The EXCLUSIVE OR gate 176 is connected to sense the presence of a complementary pair. If the two signals are not complementary but are identical, then the gate 176 goes low and disables the NAND gate 180. If a correct complementary form C transfer has occurred, the change will be recognized by the EXCLUSIVE OR gates 172 and 174 to produce an output signal from the NAND gate 180 thence through the NOR gate 210 to the input of the counter 46. When a CARRY output has been achieved at the last stage of the counter 48, the CARRY output signal is applied to the input of the NAND gate 204 which is enabled either by the form C selection switch 186 or the 8/16 selection switch 184. The output of the gate 204 is applied to the input of the gate 208 and thence to the input of the counter 50. Thus, the counter 50 is incremented whenever there has been a CARRY output signal from the counter 48. This, in turn, produces the CARRY feature for accomplishing the single 16 bit word output signal. In a normal course of events and in the absence of signals from a central processor unit, the counter 148 cycles to sequentially address the four ranks in each of the memory units hereinbefore mentioned which include the four ranks of memory. On the other hand, when the event counting module has been addressed from the central processor, the memory rank address is applied through the first two stages of the selector 160 on the A input terminal. The addressing of the event counter board causes the flip-flop 154 to SET producing an output signal which is applied to the input of the selector 160 causing that selector to respond to the A input terminal. That effectively addresses the selected level of each of the several memory modules. Then, on the occurrence of a read strobe and a read direction signal, the output line drivers 62 through 92 are ENABLED, thereby applying an output signal to the sixteen output leads in accordance with the content of the particular rank of the memory addressed.

Thus, this has been provided, in accordance with the present invention, an improved digital input circuit for computer based process control systems in which the input circuit provides a count of process related events in a choice of 8 bit output words or 16 bit output words and a choice of form A input transfers or form C input transfers.

The embodiments of the invention in which an exclusive property or privilege is claimed are defined as follows:

1. A digital event counter input circuit for a computer based process control system, said circuit comprising:
   a plurality of input circuit means for receiving a plurality of status signals, each representative of the status of an event sensor;
   scanning means for sequentially scanning said input circuit means;
   first memory means connected to the output of said scanning means for storing said status signals;
   comparing means connected to the output of said scanning means and said first memory means for comparing a sensed status of said input signal with the previous status of said input signal stored in said first memory means to detect changes in said input signal as an indication of a countable event and to produce a comparator output signal indicative of such an event;
   counting means connected to said comparing means for counting said comparator output signals;
   second memory means connected to said counting means for storing the accumulated count in said counting means for a predetermined period;
   means to apply external timing and control signals to said event counter input circuit; and output means enabled by said external timing and control signals connected to read out the accumunlated count in said second memory means whereby said accumulated count is representative of an engineering parameter and become an input signal for said computer based process control system.

2. A digital event counter input circuit for a computer based process control system, said circuit comprising:
   a plurality of input circuit means for receiving a plurality of status signals, each representative of the status of an event sensor;
   scanning means for sequentially scanning said input circuit means;
   first memory means connected to the output of said scanning means for storing said status signals;
   said first memory means having a dedicated address for each of said status signals;
   timing and control means connected to and controlling the sequential scanning of said scanning means and the correlated addressing of said first memory means whereby to store said status signals at said dedicated addresses in said first memory means;
   comparing means connected to the output of said scanning means and said first memory means for comparing a sensed status of said input signal with the previous status of said input signal stored in said first memory means to detect changes in said input signal as an indication of a countable event and to produce a comparator output signal indicative of such an event;
   counting means connected to said comparing means for counting said comparator output signals;
   second memory means connected to said counting means for storing the accumulated count in said counting means for a predetermined period means to apply external timing and control signals to said event counter input circuit; and output means enabled by said external timing and control signals connected to read out the accumulated count in said second memory means whereby said accumulated count is representative of an engineering parameter and becomes an input signal for said computer based process control system.

3. A digital event counter input circuit for a computer based process control system, said circuit comprising:
 a plurality of input circuit means for receiving a plurality of status signals, each representative of the status of an event sensor;
 scanning means for sequentially scanning said input circuit means;
 first memory means connected to the output of said scanning means for storing said status signal, said first memory means having a dedicated address for each of said status signals;
 internal timing and control means connected to and controlling the sequential scanning of said scanning means and the correlated addressing of said first memory means whereby to store said status signals at said dedicated addresses in said first memory means;
 comparing means connected to the output of said scanning means and said first memory means for comparing a sensed status of said input signal with the previous status of said input signal stored in said first memory means to detect changes in said input signal as an indication of a countable event and to produce a comparator output signal indicative of such an event;
 counting means connected to said comparing means for counting said comparator output signals, said counting means being connected to be controlled by said internal timing and control means;
 second memory means connected to said counting means for storing the accumulated count in said counting means for a predetermined period, said second memory means including a dedicated address for storing count data corresponding to each of said input status signals, said second memory means being connected to be controlled and addressed by said internal timing and control means whereby to store said accumulated count in said dedicated addresses in correlation with said scanned input signals;
 means to apply external timing and control signals to said event counter input circuit; and output means enabled by said external timing and control signals connected to read out the accumulated count in said second memory means whereby said accumulated count is representative of an engineering parameter and becomes an input signal for said computer based process control system.

4. A digital event counter input circuit for a computer based process control system, said circuit comprising:
 a plurality of input circuit means for receiving a plurality of status signals, each representative of the status of an event sensor;
 scanning means for sequentially scanning said input circuit means;
 first memory means connected to the output of said scanning means for storing said status signals, said first memory means having a dedicated address for each of said status signals;
 internal timing and control means connected to and controlling the sequential scanning of said scanning means and the correlated addressing of said first memory means whereby to store said status signals at said dedicated addresses in said first memory means;
 comparing means connected to the output of said scanning means and said first memory means for comparing a sensed status of said signal with the previous status of said input signal stored in said first memory means to detect changes in said input signal as an indication of a countable event and to produce a comparator output signal indicative of such an event;
 counting means connected to said comparing means for counting said comparator output signals, said counting means being connected to be controlled by said internal timing and control means;
 second memory means connected to said counting means for storing the accumulated count in said counting means, said second memory means including a dedicated address for storing count data corresponding to each of said input status signals, said second memory means being connected to be controlled and addressed by said internal timing and control means whereby to store said count data in said dedicated addresses in correlation with said scanned input signals;
 means connected to said internal timing and control means for applying external timing and control signals to said event counter input circuit;
 means responsive to said external timing and control signals for overriding said internal timing and control means, said external timing and control signals include signals for addressing a particular address of said second memory means; and
 output means enabled by said external timing and control signals connected to read out the accumulated count in said second memory means whereby said accumulated count is representative of an engineering parameter and becomes an input signal for said computer based process control system.

5. The digital event counter input circuit as set forth in claim 4 wherein said circuit includes means, including connection means between the output of said second memory means and said counter means, controlled by said internal timing and control means, for presetting said counting means to the accumulated count in the addressed portion of said second memory means, means for incrementing said preset count in said counting means in accordance with said comparator output signal, and means for restoring the incremented count to the addresssed portion of said second memory means.

6. The digital event counter input circuit as set forth in claim 4 wherein said circuit includes switch means for selectively configuring said circuit to respond selectively to Form A transfer input signals and Form C transfer input signals.

7. The digital event counter input circuit as set forth in claim 4 wherein said circuit includes switch means for selectively configuring said circuit to accumulate count as two multi-bit words or as a single multi-bit word, the number of bits in the single word format being equal to the sum of the bits in the two-word format.

* * * * *